United States Patent
Van Voorst

(10) Patent No.: US 10,690,772 B2
(45) Date of Patent: Jun. 23, 2020

(54) LIDAR SITE MODEL TO AID COUNTER DRONE SYSTEM

(71) Applicant: Raytheon BBN Technologies Corp., Cambridge, MA (US)

(72) Inventor: Brian R. Van Voorst, Minneapolis, MN (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 328 days.

(21) Appl. No.: 15/443,165

(22) Filed: Feb. 27, 2017

(65) Prior Publication Data

US 2017/0261999 A1    Sep. 14, 2017

Related U.S. Application Data

(60) Provisional application No. 62/364,368, filed on Jul. 20, 2016, provisional application No. 62/306,841, filed on Mar. 11, 2016.

(51) Int. Cl.
  *G01S 17/04*   (2020.01)
  *G05D 1/12*    (2006.01)
  (Continued)

(52) U.S. Cl.
  CPC ............ *G01S 17/04* (2020.01); *B64C 39/024* (2013.01); *F41H 11/02* (2013.01); *G01S 7/4817* (2013.01);
  (Continued)

(58) Field of Classification Search
  CPC ...... G01S 17/023; G01S 17/026; G01S 17/66; G01S 17/87; G01S 17/89; G01S 17/933;
  (Continued)

(56) References Cited

U.S. PATENT DOCUMENTS 4,160,974 A    7/1979   Stavis
7,046,841 B1   5/2006   Dow et al.
(Continued)

FOREIGN PATENT DOCUMENTS

CN    10521 4288 A    1/2016
EP    2252859 B1      12/2012
WO    WO 2017/041303 A1   3/2017

OTHER PUBLICATIONS

Berat Levent Gezer, Multi-Beam Digital Antenna for Radar, Communications, and UAV Tracking Based on Off-The-Shelf Wireless Technologies, Naval Postgraduate School, Monterey, California Sep. 2006, 127 pages.

(Continued)

*Primary Examiner* — Thomas G Black
*Assistant Examiner* — Luke Huynh
(74) *Attorney, Agent, or Firm* — Daly, Crowley, Mofford & Durkee, LLP

(57) ABSTRACT

A system for creating a three dimensional model of an environment includes a LIDAR scanning system to scan an environment to provide an image of a scene of the scanned environment, a geo-locator to tag a plurality of points within the image with geo-reference points and a labeler to label features of interest within the image of the scene and to identify possible access paths within the three dimensional model of the environment from the features of interest potentially providing an access path for a target drone.

18 Claims, 15 Drawing Sheets

(51) Int. Cl.
| | |
|---|---|
| *G01S 17/89* | (2020.01) |
| *G01S 17/66* | (2006.01) |
| *B64C 39/02* | (2006.01) |
| *G08G 5/00* | (2006.01) |
| *G06T 17/05* | (2011.01) |
| *F41H 11/02* | (2006.01) |
| *G01S 17/933* | (2020.01) |
| *G06K 9/00* | (2006.01) |
| *G01S 17/86* | (2020.01) |
| *G01S 7/495* | (2006.01) |
| *G01S 7/51* | (2006.01) |
| *G01S 17/87* | (2020.01) |
| *G01S 7/481* | (2006.01) |
| *G05D 1/00* | (2006.01) |
| *G05D 1/10* | (2006.01) |
| *H04W 4/021* | (2018.01) |
| *F41H 13/00* | (2006.01) |

(52) U.S. Cl.
CPC ............... *G01S 7/495* (2013.01); *G01S 7/51* (2013.01); *G01S 17/66* (2013.01); *G01S 17/86* (2020.01); *G01S 17/87* (2013.01); *G01S 17/89* (2013.01); *G01S 17/933* (2013.01); *G05D 1/0016* (2013.01); *G05D 1/0088* (2013.01); *G05D 1/0094* (2013.01); *G05D 1/101* (2013.01); *G05D 1/12* (2013.01); *G06K 9/0063* (2013.01); *G06T 17/05* (2013.01); *G08G 5/0026* (2013.01); *G08G 5/0069* (2013.01); *G08G 5/0082* (2013.01); *H04W 4/021* (2013.01); *B64C 2201/027* (2013.01); *B64C 2201/108* (2013.01); *B64C 2201/12* (2013.01); *B64C 2201/121* (2013.01); *B64C 2201/141* (2013.01); *B64C 2201/146* (2013.01); *F41H 13/0006* (2013.01); *G06K 2209/21* (2013.01)

(58) Field of Classification Search
CPC .......... G01S 7/4817; G01S 7/495; G01S 7/51; B64C 39/024; F41H 11/02; G05D 1/0016; G05D 1/0088; G05D 1/0094; G05D 1/101; G05D 1/12; G06K 9/0063; G06T 17/05; G08G 5/0026; G08G 5/0069; G08G 5/0082

USPC .......................................................... 701/3
See application file for complete search history.

(56) References Cited

U.S. PATENT DOCUMENTS

| | | | |
|---|---|---|---|
| 7,248,342 B1* | 7/2007 | Degnan | G01C 3/08 |
| | | | 342/120 |
| 8,212,995 B2 | 7/2012 | Koehler et al. | |
| 8,370,105 B2 | 2/2013 | Kobayashi et al. | |
| 8,599,367 B2* | 12/2013 | Canham | G01C 3/08 |
| | | | 356/3.01 |
| 8,625,854 B2 | 1/2014 | Valkenburg et al. | |
| 8,811,720 B2* | 8/2014 | Seida | G06T 15/20 |
| | | | 382/103 |
| 8,939,081 B1 | 1/2015 | Smith et al. | |
| 9,275,645 B2 | 3/2016 | Hearing et al. | |
| 9,354,317 B2 | 5/2016 | Halmos | |
| 9,567,078 B2* | 2/2017 | Zang | G05D 1/0038 |
| 2012/0022719 A1* | 1/2012 | Matos | B64C 39/024 |
| | | | 701/2 |
| 2013/0141735 A1 | 6/2013 | Sogard et al. | |
| 2014/0148978 A1* | 5/2014 | Duncan | A01M 29/10 |
| | | | 701/3 |
| 2014/0172200 A1 | 6/2014 | Miralles | |
| 2015/0260824 A1 | 9/2015 | Malveaux | |
| 2015/0293229 A1 | 10/2015 | Halmos | |
| 2015/0302858 A1 | 10/2015 | Hearing et al. | |
| 2015/0362595 A1* | 12/2015 | Isaksson | G01S 17/023 |
| | | | 345/419 |
| 2016/0023760 A1 | 1/2016 | Goodrich | |

OTHER PUBLICATIONS

Shuqun Zhang, Object Tracking in Unmanned Aerial Vehicle (UAV) Videos Using a Combined Approach, Department of Computer Science, College of Staten Island, City University of New York, IEEE, 2005, pp. II-681-II-684, 4 pages.

Tien Pham, Nino Srour, TTCP AG-6: Acoustic Detection and Tracking of UAVs, SPIE vol. 5417, Sep. 1, 2004, pp. 24-30, 7 pages.

Office Action dated Dec. 14, 2018 for U.S. Appl. No. 15/443,173; 10 Pages.

Office Action dated Dec. 17, 2018 for U.S. Appl. No. 15/443,156; 13 Pages.

Anderton; "Synchronized Line-Scan LIDAR/EO Imager for Creating 3D Images of Dynamic Scenes: Prototype II;" Utah State University; 2005; 148 Pages.

* cited by examiner

LIDAR SITE MODEL TO AID COUNTER DRONE SYSTEM

CROSS REFERENCE TO RELATED APPLICATION

This application claims priority from U.S. Provisional Patent Application Ser. No. 62/364,368, filed on Jul. 20, 2016, and U.S. Provisional Patent Application Ser. No. 62/306,841, filed on Mar. 11, 2016, both of which are incorporated herein by reference in their entirety.

FIELD OF THE INVENTION

This disclosure relates generally to drones and more particularly to a technique to detect and track drones.

BACKGROUND

In recent years, the advancement of unmanned aerial vehicles or drones has matured where drones are readily available at nominal costs to be purchased by private individuals. The readily availability of drones to be used by private individuals bring on additional concerns for law enforcement and security personnel where drones can be used for unwanted or illegal activity. For example, a drone carrying contraband can be used by an individual to fly over a prison and deliver the contraband within the prison walls. Drones can be flown into private areas, carry explosives, or deliver contraband to personnel located in the private areas. Furthermore, drones can be flown into air space that then prevents manned airplanes from flying a desired course. Other possibilities of the use of drones are only left to the imagination of unlawful actors and hence it is desirable for a system to locate a drone and render it useless when the drone is identified as a nuisance or danger.

SUMMARY

In accordance with the present disclosure, a system for creating a three dimensional model of an environment includes a LIDAR scanning system to scan an environment to provide an image of a scene of the scanned environment, a geo-locator to tag a plurality of points within the image with geo-reference points and a labeler to label features of interest within the image of the scene and to identify possible access paths within the three dimensional model of the environment from the features of interest potentially providing an access path for a target drone. With such an arrangement, a three dimensional model of an environment can be provided to aid in preventive planning for countering undesired drones.

The system may include one or more of the following features independently or in combination with another feature to include: wherein the LIDAR scanning system comprises a tracking system to track objects in the scanned environment and the tracking system determines if a new track is a false track by looking where the track originated; wherein the tracking system generates an intercept track for an intercept drone from the possible access paths determined from the labeler and the environmental model; a response planner to plan safe paths through the environment for an intercept drone; wherein the response planner includes identifying false positives; a response planner to plan the placement of sensors within the environment to reduce blind spots in the environmental model; a response planner to plan interceptions that minimize collateral damage; a response planner to select an appropriate countermeasure including deploying a second drone to intercept the target drone; or a response planner to pilot an intercept drone around obstacles that have been mapped in the scene apriori.

In accordance with the disclosure, a method of providing a three dimension model of an environment includes: scanning an environment to provide an image of the scanned environment; tagging a plurality of points within the image with geo-reference points to identify the location of a plurality of points; labeling features of interest within the image and identifying possible access paths within the three dimensional model of the environment from the features of interest potentially providing an access path for a target drone.

The method may include one or more of the following features independently or in combination with another feature to include: tracking objects in the scanned environment and determining if a new track is a false track by looking where the track originated; generating an intercept track for an intercept drone from the possible access paths determined from features of interest within the image; planning safe paths through the environment for an intercept drone from the features of interest within the image; identifying false positives; planning the placement of sensors within the environment to reduce blind spots in the environmental model; planning interceptions that minimize collateral damage; selecting an appropriate countermeasure including deploying a second drone to intercept the target drone; or piloting an intercept drone around obstacles that have been mapped in the scene apriori.

In accordance with the present disclosure, a drone detection system includes: a LIDAR scanning system to scan an environment to provide an image of a scene of the scanned environment and to detect a target drone entering the scanned environment; a geo-locator to tag a plurality of points within the image with geo-reference points; a labeler to label features of interest within the image of the scene and to identify possible access paths within the three dimensional model of the environment from the features of interest potentially providing an access path for the target drone; and a response planner to select an appropriate countermeasure including deploying a second drone to intercept the target drone.

The drone detection system may additionally include the feature of a tracking system to track objects in the scanned environment and wherein the tracking system generates an intercept track for an intercept drone from the possible access paths determined from the scanned environment.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

The present disclosure describes techniques to use LIDAR as a sensor to track drones. Light detection and ranging (LIDAR) can be used to create three-dimensional (3D) imagery of a field of view. A LIDAR system includes a light source, such as a laser, that generates and directs pulses of light. The light pulses are reflected by the surface of various objects, such as the ground, a tree, or a building or an object in the air such as a drone. A sensor in the LIDAR system detects the reflections. The relative location of the reflecting surface can be determined by the lidar from the elapsed time from when the light pulse is generated and when it is detected. This cycle of pulse and detection may be repeated thousands of times per second. The coordinate frame of detection can be translated into another coordinate frame for display using common methods. The reflected light pulses are used to create a 3D image of the scanned area or field of view. An operator may then use pan and zoom commands to change the camera or sensor orientation and see different portions of the scanned area or field of view.

A LIDAR has advantages over other sensors for tracking drones. Short range LIDARs (~100 m) can interrogate all of their airspace and detect a drone, however the range of 100 meters has limited value. If we use a long range LIDAR (1000 m) however because of the narrow field of view, it is not practical for the long range LIDAR to do detection. Our disclosure uses a two-tiered approach of using an alerting system to cue the long range LIDAR so we may take advantage of the long range LIDAR. To make a long range LIDAR feasible we use a second sensor to alert (cue) that there is a drone present to track. The second sensor does not need to do a good job of long range tracking, it only needs to provide a small area to search with the long range LIDAR to find the drone. LIDAR also provides very precise three dimensional (3D) location information and is capable of detecting the physical presence of an object in most all lighting conditions. It doesn't require the drone to emit RF and it works if the drone is stationary or slow or fast or regardless of being close to the ground or high in the air.

LIDAR has advantages over radar in that LIDAR allows for more accurate location and has a smaller spot size allowing for a more accurate image of a target to be formed.

Figure 1:
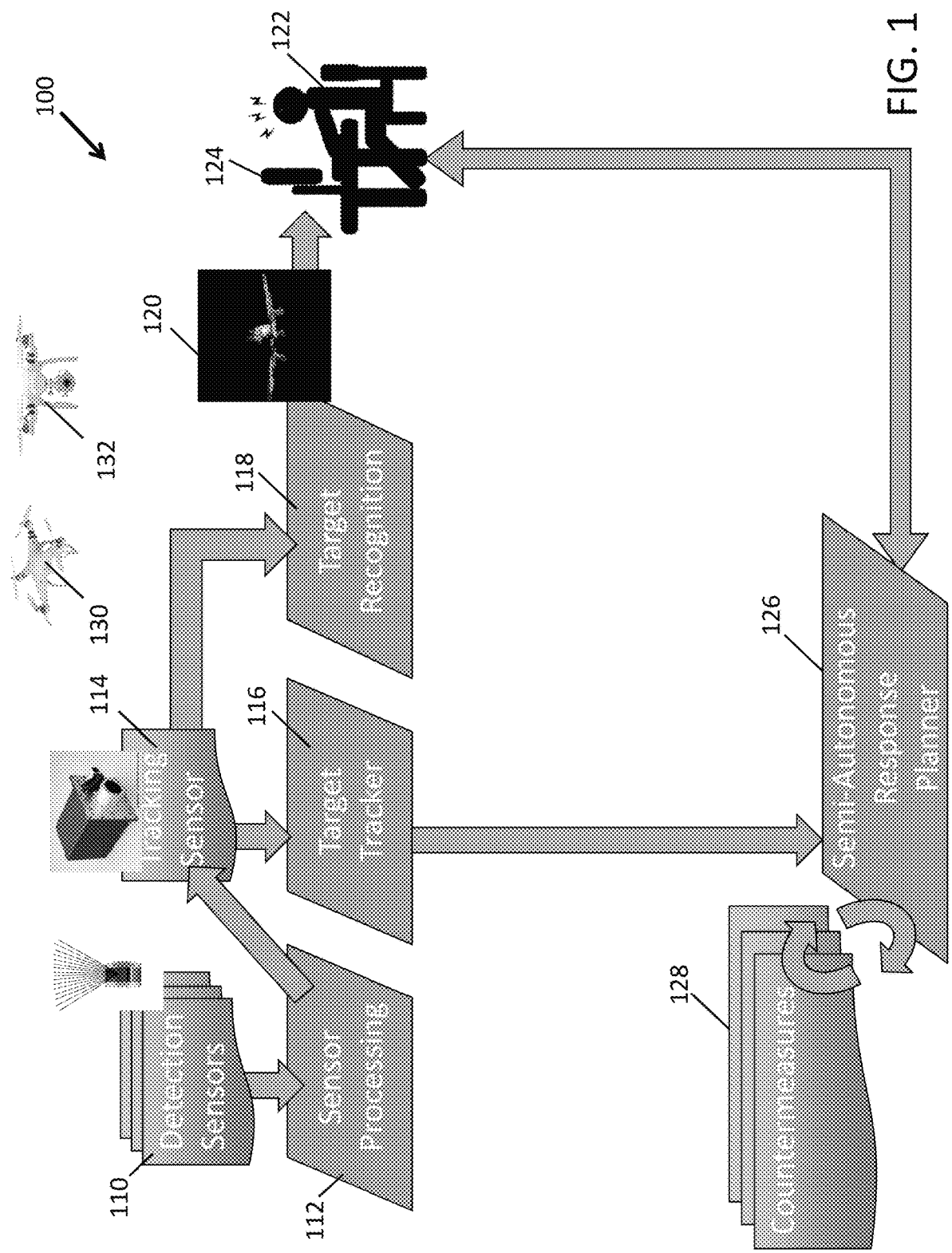
FIG. 1 is a diagram of a drone detection system.

Referring now to FIG. 1, a drone detection system 100 (sometimes referred to as a counter drone system) is shown to include a plurality of detection sensors 110 arranged to detect an object, more specifically a drone 130. A detection processor 112 captures the existence of an object and cues the presence of a drone 130 to a tracking sensor 114 which acquires and tracks at long range the drone 130 using target tracker 116. An image of a target drone once cued can be fed to a target identifier 118 for target recognition and the image 120 of the cued target can be displayed to an operator 122 on display 124 so the operator 122 can verify and analyze the cued target. The target tracker 116 also feeds the target tracks to a semi-autonomous response planner system 126 with inputs also from the operator 122 can determine countermeasures 128 appropriate for the cued target. For example, a interceptor drone 132 can be deployed.

From the latter, it can be seen, a counter drone system is provided wherein a cueing sensor provided by the detections sensors 110 is able to detect the presence of an object wherein the cueing sensor cues the presence of a target drone. A long range LIDAR system provided by the tracking sensor 114 and the target tracker 116 with a sensor pointed in a direction of the target drone to acquire and track at long range the target drone can provide an accurate location of the target drone wherein once a track is acquired, the motion of the target drone along with a Kalman Filter is used to maintain the track of the target drone. A threat detector provided by the target identifier 118 uses LIDAR data which is provided to the threat detector to determine if the target drone is a threat. Furthermore, countermeasures 128, in response to the operator 122 or the semi-autonomous response planner 126, can then be implemented to render useless the target drone when the target drone is identified as a nuisance or danger. Optionally cameras can be aimed at the track as well. LIDAR (and optional camera) data is given to human operator 122 to determine threat vs. non-threat or automated techniques can be used as well. Sensor fusion techniques can also be used to combine the camera and lidar data to assist in threat determination.

A camera can be aimed toward the target to get further information about the target. Where to aim the camera can based on the target tracker and knowledge about the camera coordinate frame and the tracker sensor coordinate frame as to be discussed further herein below.

It should be appreciated drone detection and tracking is accomplished wherein one sensor 110 being a LIDAR or (alternatively, acoustics, infrared, etc) cues the presence but not high resolution location of a drone, and a LIDAR tracking sensor 114 (flash, Geiger mode, line scanning) is aimed to acquire and track at long range the target to provide an accurate location. Once the track is acquired, the sensing of the target, and the prediction of the motion of the target using standard means (such as a Kalman Filter) is used to maintain the track of the target.

It should be understood any Line scanning LIDAR is a suitable cuing sensor. Examples include a Quanergy M8, or a Velodyne VLP16. This is configured as a light fence facing upward and is described in FIG. 2.

A line scanning Lidar such as a Velodyne VLP-16 or similar can be configured as an upwards facing light fence. An object that breaks the light fence will be registered by the LIDAR and it's location can be translated into a coordinate, and in the case of a multibeam LIDAR, a vector. This defines a search space for the long range LIDAR to hunt for the object that has broken the light fence. Several such lidars configured as a light fence may be networked together to form a parimeter around a location to protect the location such as the White House, an airport, or a prison. Acoustic sensor systems could also be used to cue the sensor. In this case the audible signature of the drone is detected by a microphone array and translated into an approximate location. Similarly a radar could be used to cue the sensor.

Once cued, the long range LIDAR will "hunt" for a flying object that is defined as an object that is off the ground, and in open space that is previously known to have been empty space. If the object is moving it is tracked. If the object is stationary it is observed stationary.

It should be understood the response planner 126 will do the following tasks when an object is observed:

Display the raw lidar data 24 (FIG. 3) to a human operator.

Figure 3:
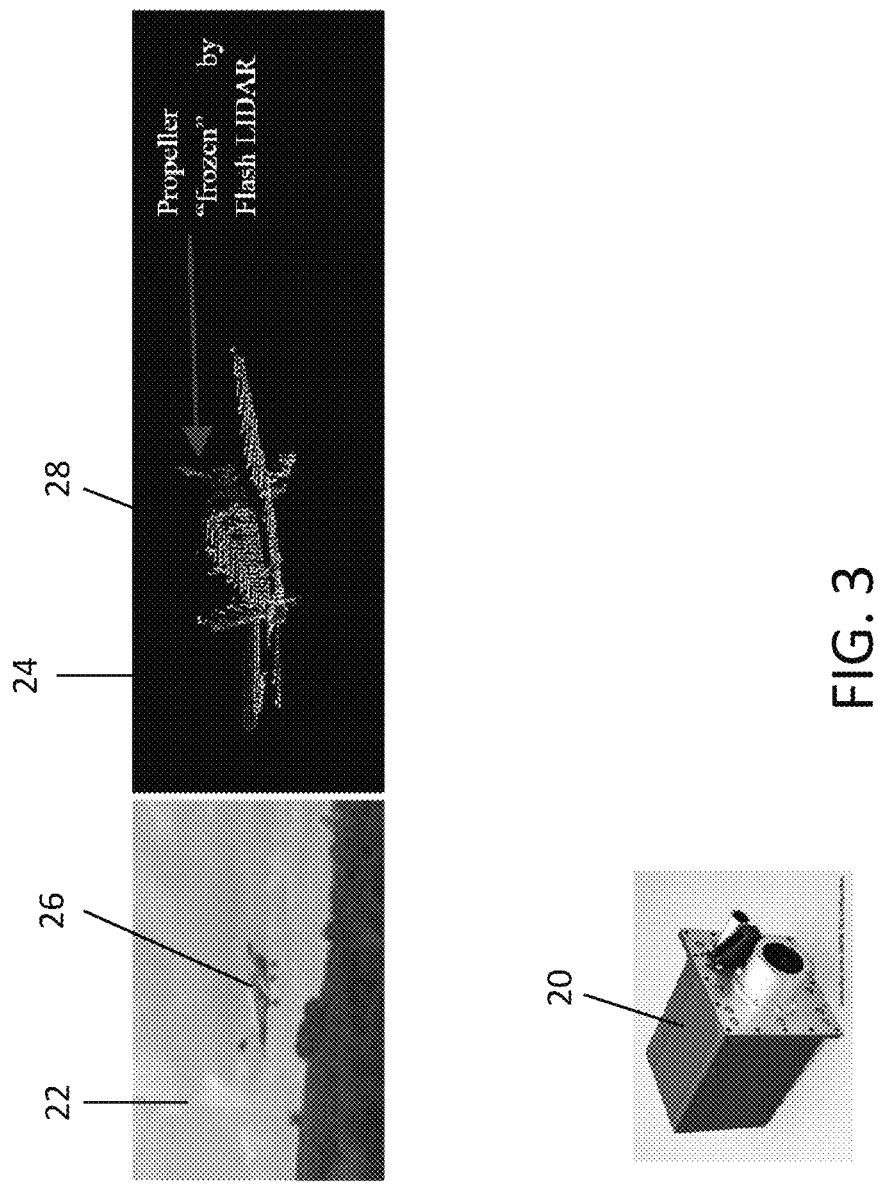
FIG. 3 is a sketch of a tracking LIDAR with a field of view of a camera picture of a target and the corresponding LIDAR image taken from a LIDAR scanner.

Aim a camera at the location of the target and present the operator with the camera view 22 (FIG. 3).

Figure 3A:
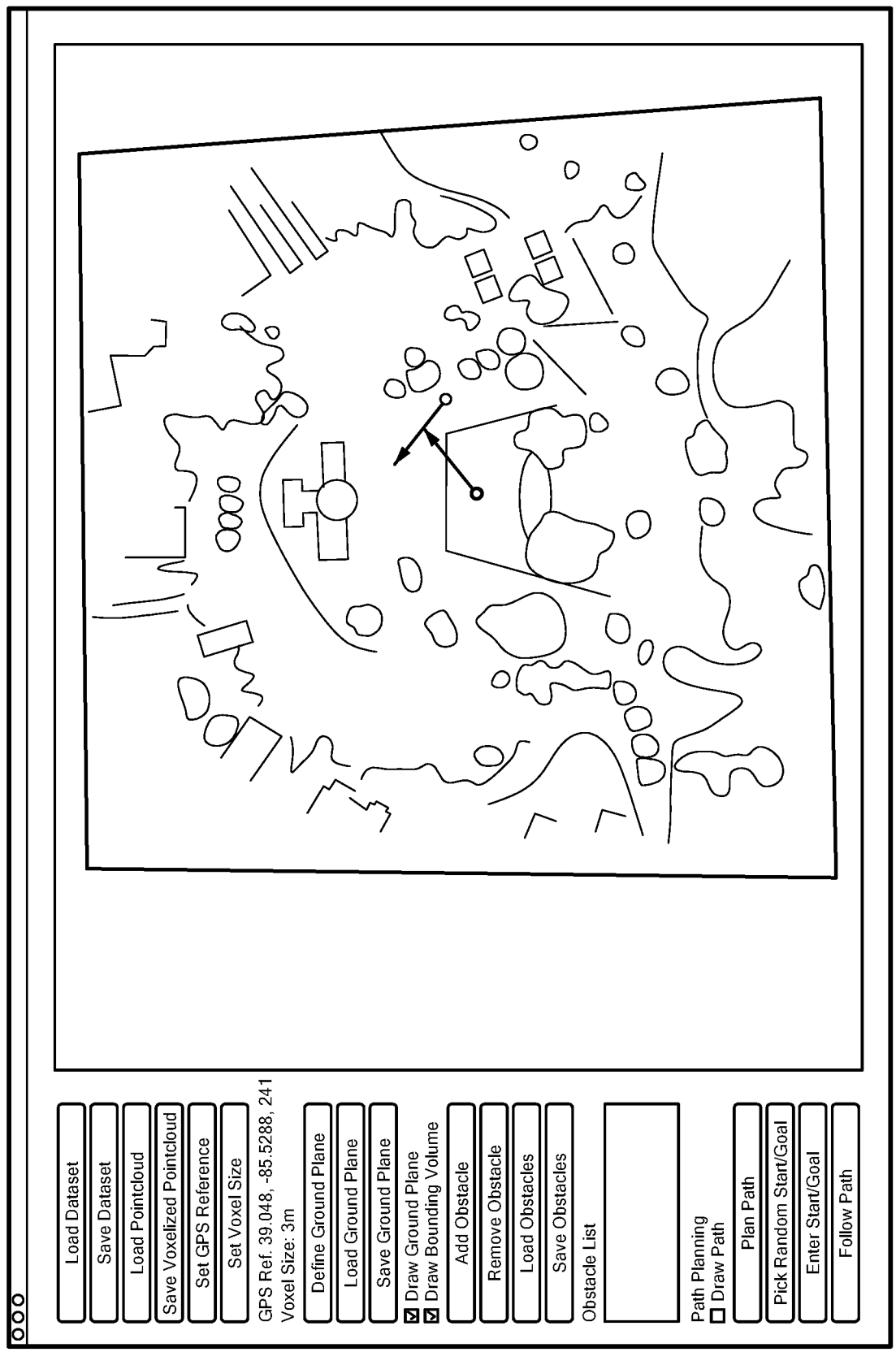
FIG. 3A is a diagram of a planned intercept course.

Plan an intercept course for the intercept asset to the object based on its trajectory (FIG. 3A).

If authorized, launch the intercept drone. This action is of "low regret" because the operator can still over ride the interceptor, however this allows the interceptor to close range on the target.

The response planner can also take into consideration the 3D site models as described herein.

Figure 2:
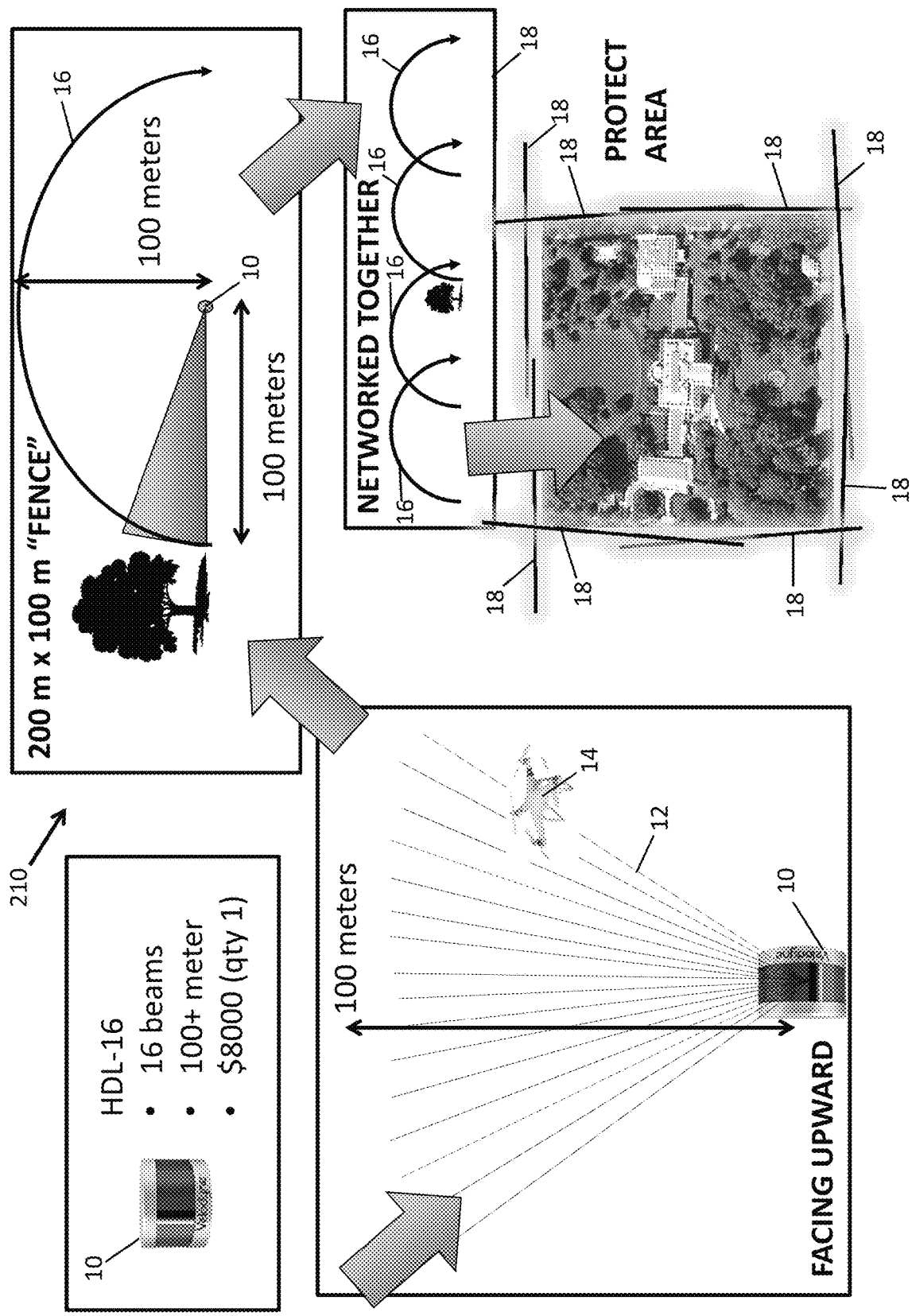
FIG. 2 is a diagram of using a LIDAR element to provide an electronic fence to protect an area of concern.

Referring now to FIG. 2, a drone cuing system 210 is shown having a plurality of LIDAR sensors 10. LIDAR sensor 10 in one embodiment provides 16 beams and has a range of approximately 100 meters. LIDAR sensor 10 is disposed so that the beams 12 are pointed upward such that the beams 12 can detect an object, here drone 14 when the drone 14 enters the range of the LIDAR sensor 10. The LIDAR sensor 10 is disposed on a surface and when the beam 12 is scanned from one horizon into the air to the other horizon creates a fan 16 that interrogates the air space within the range of the LIDAR sensor 10. A plurality of sensors 10 can be arranged along a line and networked together to provide a light-fence 18. By then disposing a plurality of light fences 18 around an area to be protected, a fence can be created to detect objects entering the light fence 18. With such an arrangement, a detection system 210 for a drone detection and tracking system for cuing a tracking system is provided where a line scanning LIDAR is pointed upward to make a light-fence, and objects detected by the light-fence can be used to cue a tracker. Several such light-fence sections can be established together around a perimeter of an asset to establish a light fence around the asset. The inbound vector of an object can be given to a second LIDAR (flash, Geiger mode, line scanning) that is aimed to acquire and track the target to provide an accurate location. Once the track is acquired, the motion of the drone is used as input to maintain the track of the target.

From the latter, it can be seen, a system according to the disclosure includes a three dimensional line-scanner LIDAR sensor disposed on a side to provide a set of fanned beams that travel from one horizon into the air to the other horizon to detect an object and create a track for the object and a long range sensor can be provided to track the object detected by the line-scanner LIDAR sensor in response to an initial track of the object created by the line-scanner LIDAR sensor.

As described above, a system can be alerted when a drone is flying through a vertical plane. Interested parties are alerted when a drone is invading their space. By putting a line-scanning LIDAR on its side, a set of fanned beams are created that go from one horizon, into the air, and to the other horizon (left, up, right). Anything flying through these beams can be detected, and a track can be established. This becomes a detection system that can cue another sensor like a long range LIDAR. By surrounding a valuable object (or location) with a light fence, an alert can be provided whenever something flies into the monitored airspace. The system can be used to alert a long range LIDAR to the presence of a drone so that the long range LIDAR can track it. Because of the narrow field of view, it is not practical for the long range LIDAR to do detection. The light fence provides a technique for detection and to provide an accurate location where the long range LIDAR should look.

It should be understood a line-scanning LIDAR is available from several vendors to include models available such as a Velodyne VLP16, HDL32, SICK LMS 111, or a Quanergy M8. It should also be understood that the concept of a light fence is well known in the art. In general to make a light fence: Turn on Lidar, Take a few scans for the Lidar to learn all the expected return ranges for all beams at all angles. For example at 132 degrees the light may travel 30 meters before reflecting off a branch. We know between 0-30 meters is open space because the beam reflected back at 30 meters. At 140 degrees there may not be any return because the beam went up in the air and nothing reflected back. We store this profile for each beam. When watching the fence you are looking for deviation from the expected pattern. If at 132 degrees there is a return at 18 meters, something has broken the open space and blocked the beam before the expected 30 meter range. If at 140 degrees there is a return at 93 meters, then an object has appeared at 93 meters that was previously open air. If the Lidar has multiple beams, several such breaks in different beams will establish a vector. By networking the LIDAR sensors together, a fence can be created to detect when an object penetrates the fence. Networking the lidars together is nothing more than turning them all on with appropriate power and data connections. They do not need to know about each other, they can all operate independently. To form a coordinate system around these sensors they need to be surveyed in, so that beam breakages can be translated into a global coordinate frame such as GPS.

Referring now also to FIG. 1, it should now be appreciated for the fan LIDAR, the detection is made by an object flying through the fan. The drone cuing system 210 gives best vector information to the tracking sensor 114 and target tracker (tracking controller) 116. The tracking controller 116 aims flash LIDAR to predicted track location and starts hunting for the object in the sky. An object is segmented from background by being in open air. The object is tracked in LIDAR frame using existing LIDAR tracking code and the tracking information is fed back into tracking controller 116. Optionally cameras can be aimed at the track as well. LIDAR (and optional camera) data is given to human operator 122 to determine threat vs. non-threat or automated techniques can be used as well. Sensor fusion techniques can also be used.

Referring now to FIG. 3, a tracking LIDAR 20 is shown where an ASC Tiger Cub Flash LIDAR emits a flash of laser light and uses a CCD to capture range information. Field of view is narrow, like that of a camera. The tracking LIDAR 20 pointed toward a target 26 will return an image 28 of the target 26. The range can be up to 1 km. At 1 km, pixels are about 20 cm, at 500 m, pixels are about 10 cm, and at 100 m, pixels are about 2 cm. A given inbound track from a cuing detection system 210 provides the location information of a target drone such that a tracking LIDAR 20 can scan the sky on a pan/tilt head to find a UAV or drone. Once an UAV is found, the tracking LIDAR 20 can track the UAV, providing 3D coordinates for counter measures, provide a 3D model of the object for classification, and give a clean view of an object to an operator for go/no-go decision.

Figure 4:
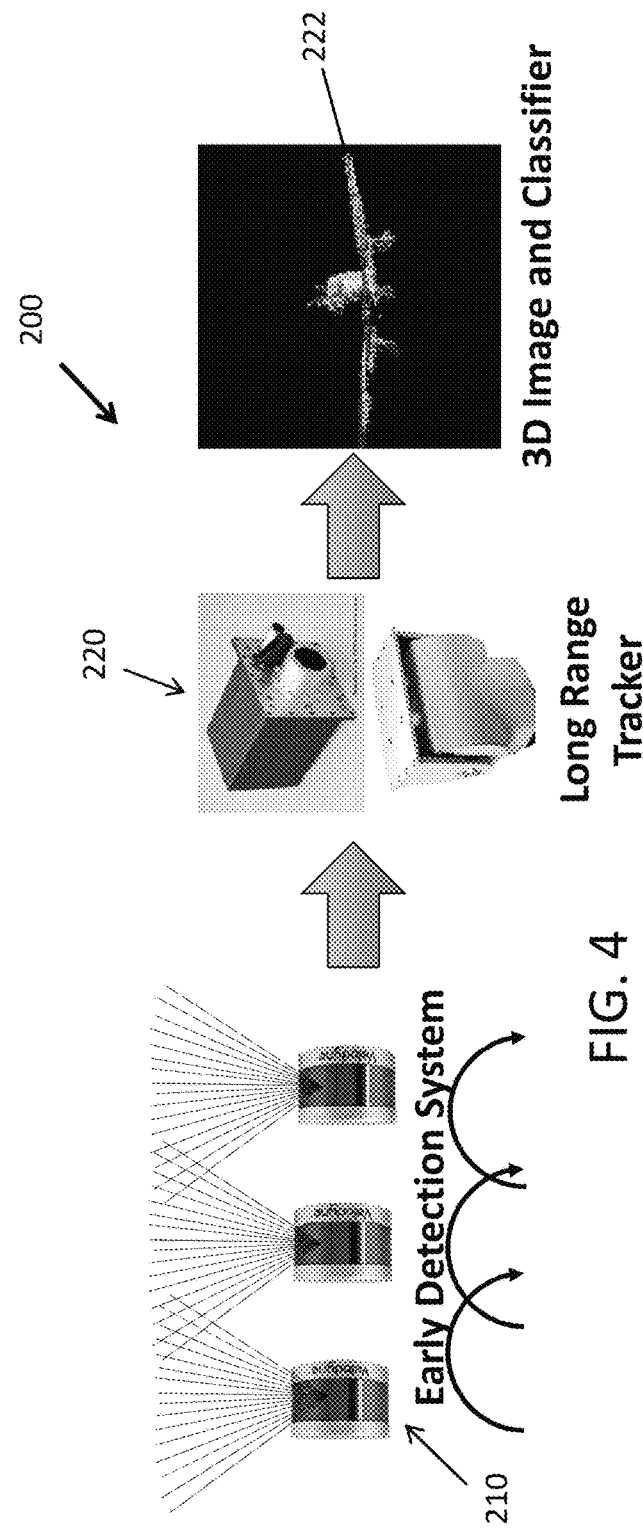
FIG. 4 is a diagram of an early detections system with a tracking LIDAR to track a target.

Referring now to FIG. 4, a drone detection and tracking system 200 includes an early detection system provided by drone cuing system 210 for detecting the presence of a drone. The cue sensor 10 facing upward uses it's modality to detect the presence of drones. It should be appreciated that the initial detectors could be acoustic, infrared, radar or other sensors but here we are describing a LIDAR sensor. For the fan LIDAR sensor, the detection is made by vector flying through the fan. The cue sensor 10 from the early detection system 210 gives best vector information to long range tracker 220. The long range tracker 220 aims flash LIDAR to an object 222 to a predicted track location and starts hunting for the object 222 in sky. The object 222 is segmented from background by being in open air. The object 222 is tracked in LIDAR frame using existing LIDAR tracking code and the tracking information is fed back into tracking controller of long range tracker 220. Optionally cameras can be aimed at the track as well. As described with FIG. 1, LIDAR (and optional camera) data is given to a human operator 122 to determine threat vs. non-threat and automated techniques can be used as well. Sensor fusion techniques can also be used.

Figure 5:
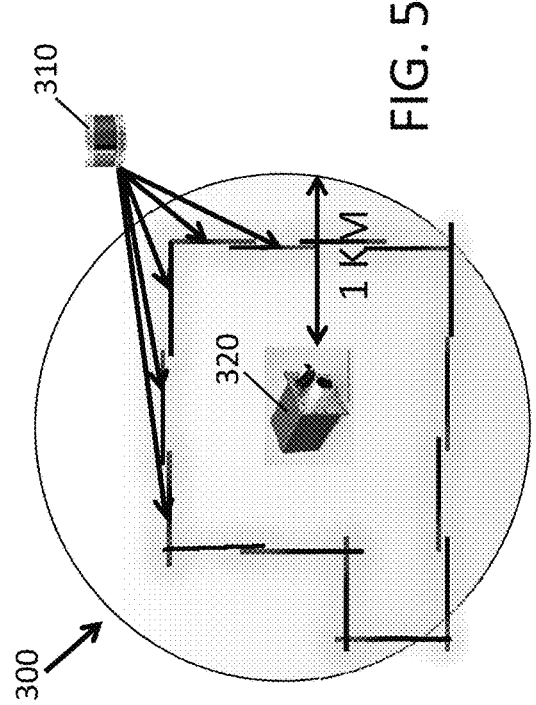
FIG. 5 is a diagram of a plurality LIDAR elements disposed to provide an electronic fence with a long range tracking LIDAR.

Referring now to FIG. 5, a drone detection and tracking system 300 is shown where a line scanning LIDAR 310 is pointed upward to make a light-fence, and flying entities that fly through the light fence establish an inbound vector. Several such light-fence sections can be established together around the perimeter of an asset. The inbound vector is given to a second LIDAR 320 (flash, Geiger mode, line scanning) that is aimed to acquire and track the target to provide an accurate location. Once the track is acquired, the motion of the drone is used as input to maintain the track of the target. As to be described hereinafter in connections with FIG. 8, one or more intercept drones are then tasked to the location of the first drone carrying a counter measure device such as a localized jammer, or net, or net gun based on the track from the ground based system.

Figure 6:
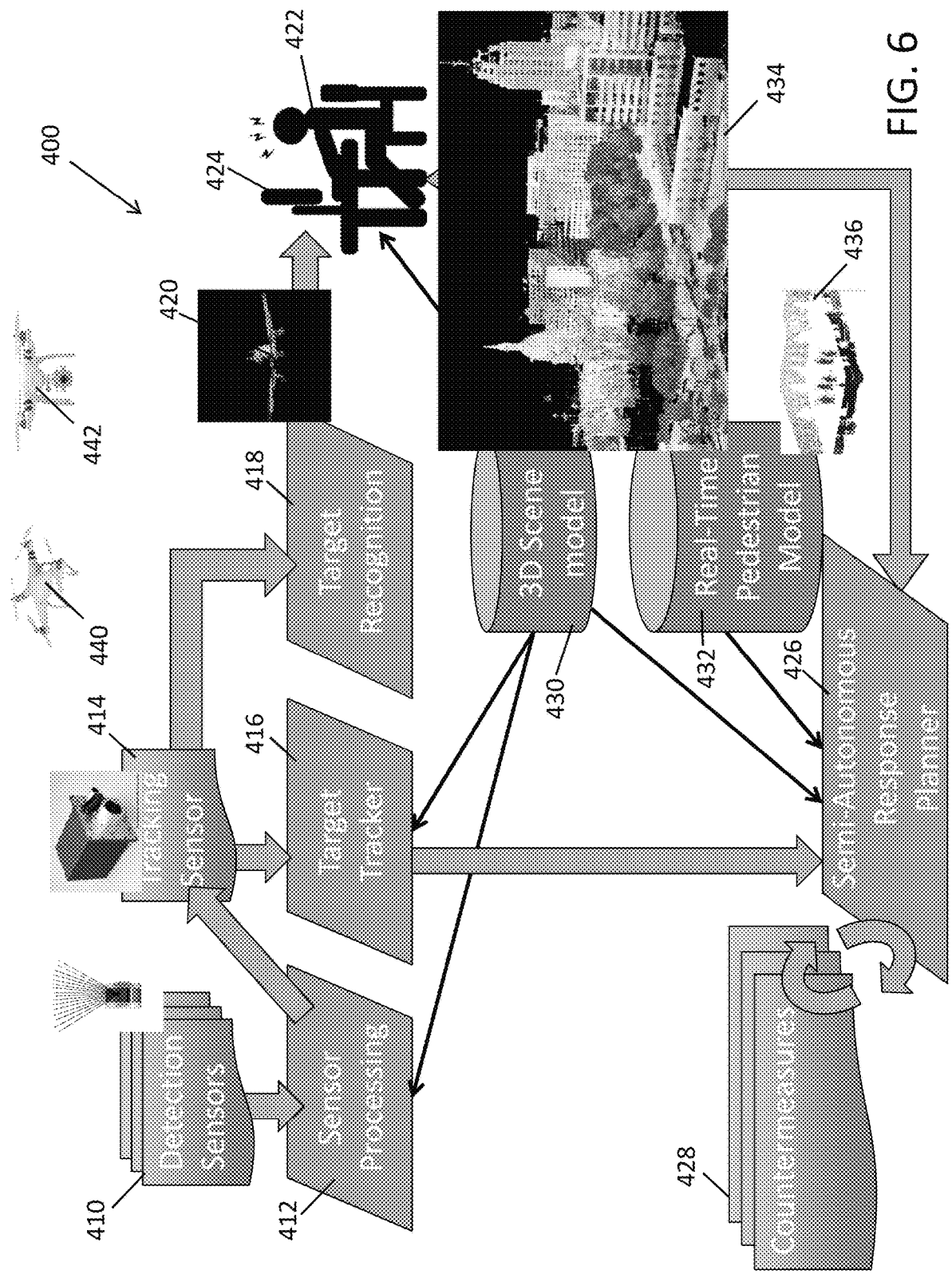
FIG. 6 is a diagram of a drone detections system with a three dimensional scene model for analyzing an environment.
Figure 6A:
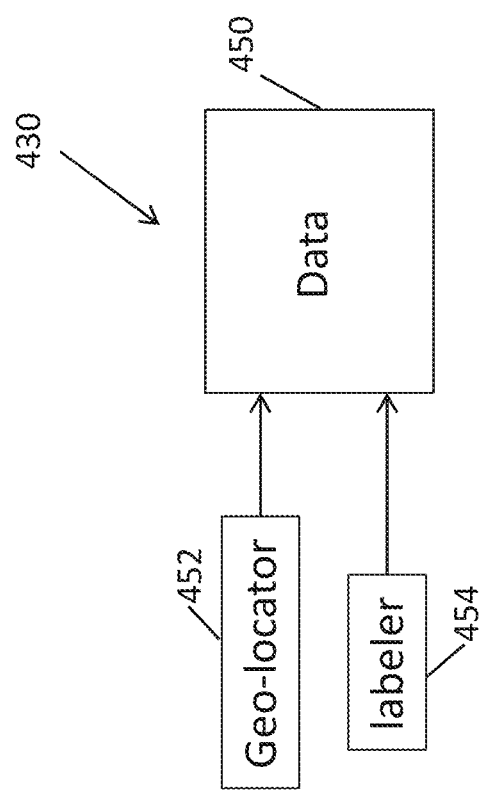
FIG. 6A is a diagram of a geo-locator and labeler included within the drone detection system of FIG. 6.

Referring now to FIGS. 6 and 6A, a drone detection system 400 is shown to include a plurality of detection sensors 410 arranged to detect an object, more specifically a drone 440. A detection processor 412 captures the existence of an object and cues the presence of a drone to a tracking sensor 414 which acquires and tracks at long range the drone using target tracker 416. An image of a target drone once cued and tracked can be fed to a target identifier 418 for target recognition and the image 420 of the target is displayed to an operator 422 on display 424 so the operator 422 can verify and analyze the target. The target tracker 416 also feeds the target tracks to a semi-autonomous response planner system 426 and with inputs also from the operator 422 can determine countermeasures 428 appropriate for the target. The drone detection system 400 also includes a system 430 for creating a three dimensional model of an environment where in the detection sensors 410 and the tracking sensors 414 with the target identifier 418 provides a scanning system to scan an environment to provide an image 434 of the scanned environment, a geo-locator 452 is used to tag a plurality of points within the image with geo-reference points and a labeler 454 is used to label features of interest within the image and to identify possible access paths within the features of interest potentially providing an access path for a target drone. Furthermore, a real-time pedestrian model system 432 is provided to track locations of pedestrians in an environment 436. It should be noted the environment 436 can include a portion of the image 434, include all of the image 434, or include more than the environment captured by image 434.

It should be appreciated surveying a site by LIDAR to create a 3D model of the environment can be used as input for: a) explaining false positives when detecting and tracking drones, b) calculating fields of view when detecting and tracking drones, c) optimizing countermeasures for drones, and d) planning routes for countermeasures for drones. Using known methods, a 3D scan of the environment is made producing a detailed point cloud of fixed objects and points are Geo-referenced in this model. The model gets loaded into command and control software. The command and control software is written to use this model when planning way points for interception by avoiding objects that are possible collisions (e.g trees) without requiring on board sensing. The model is used when reading and considering new tracks (from LIDAR or other sensor (e.g. radar, acoustics)) to determine if location of a new track is likely to really be from noise (traffic, waving flag, fireworks, . . . ) or in fact a potential target. The model is used when evaluating blind spots of the system for deployed sensors by placing their location and field of view into the model and tracing their field of view for intersections with fixed objects in the model (building, trees). The model is used when deciding the windows of opportunity for counter measures and prioritizing their use by considering how long a window of opportunity to intercept is possible, if there is collateral damage (pedestrians), chance of interference (radio tower, multi-path off building), etc. based on modality (jamming, projectile, etc).

Figure 6B:
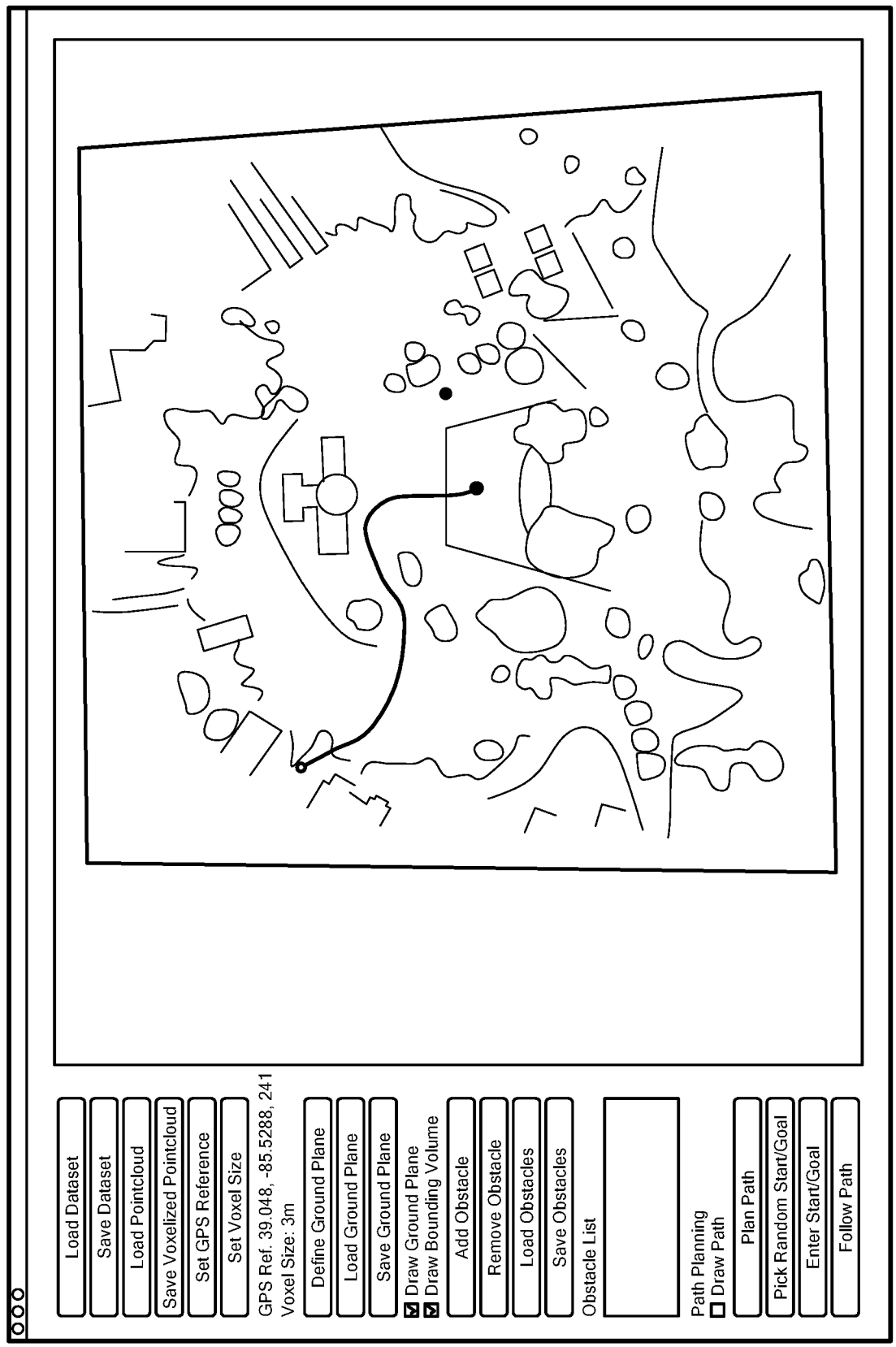
FIG. 6B is a diagram of an object avoidance path.

It should now be appreciated the system 400 can create a 3D model of the environment (buildings, trees, roads, parking lots, etc) and use the context of the world to perform better tracking, better false positive rejection, better intercept planning, perform obstacle avoidance for the intercept vehicle, better site preparation for a counter drone detection, tracking and intercepting platform, for example, as shown in FIG. 6B. Using known methods, the system 400 can make a 3D scan of the environment producing a detailed point cloud of fixed objects and the objects are geo-reference in this 3D scan model.

Referring now to FIG. 6A, a system for creating a three dimensional model of an environment includes the 3D scene model 430 where a LIDAR scanning system to scan an environment provides an image of the scanned environment which is stored as data 450 and a geo-locator 452 is used to tag a plurality of points within the image with geo-reference points and a labeler 454 is used to label features of interest within the image and to identify possible access paths within the features of interest potentially providing an access path for a target drone.

To implement the described technique, the system 400 scans the environment with a LIDAR detection sensor. This can be done by an aerial platform, mobile mapping platform, or a stationary platform using detection sensors 410. See for example the image of the scenes in FIG. 6B or FIG. 6C. Next, the system 400 geo-references the points in the scene with GPS using known techniques. This is common practice. The system 400 will next label the scene with features of interest. Examples include: roads (roads have cars, cars move); trees (trees sway in the wind, move slightly; trees are obstacles to avoid with drones); buildings (buildings are high value items we don't want to hurt); areas with people (areas we want to avoid collateral damage); and other features of interest can be considered. Labeling of this data could be done by hand or automated methods, or by geo referencing other data sources. Having the latter information available, a mission planner can now consider placement of assets in the model as well as predict where enemy drones may come from. A mission planner can consider windows of opportunity for counter measures and analyze blind spots. The mission planner can analyze areas where false positives (birds, for example) may come from. By playing what-if scenarios, the mission planner can come up with a better placement of assets to protect what needs protection. Furthermore, having the latter information available, when a track is first discovered, the mission planner can consider the likelihood it is a false track by where it originated from. For example, if it came from a tree, there is a possibility it may be a bird. Other sensors reports can be considered. Acoustic solution detections can be evaluated in the model, as well as radar detections, if desired. Radars may produce false tracks off cars, etc. More false positives can be rejected by understanding where the false positives are originating from. With such a technique, when a track is validated as a threat and countermeasures will be launched, the mission planner can use the 3D model to plan which countermeasure can/should be launched, and determine when an opportunity to intercept is most likely. If the selected countermeasure is deploying another drone, the mission planner can pilot an intercept drone around obstacles because the obstacles have been mapped in the scene apriori. Also with such a technique, if a counter measure may do collateral damage (cause debris to fall, overshoot, jam RF in a cone, etc), the mission planner can plan the best opportunity for minimal collateral damage because a 3D model of the scene is available. The mission planner can compute the firing angles, debris patterns, and effects of range of various systems and choose to engage at a time and place likely to cause the least damage.

Figure 6C:
FIG. 6C is an example of a three dimensional scene.
Figure 6D:
FIG. 6D is another example of a three dimensional scene.

Referring now to FIGS. 6C and 6D, examples of a three dimensional scene are shown. As described above, a geo-locator is used to tag a plurality of points within the image with geo-reference points and a labeler is used to label features of interest within the image and to identify possible access paths within the features of interest.

Figure 7:
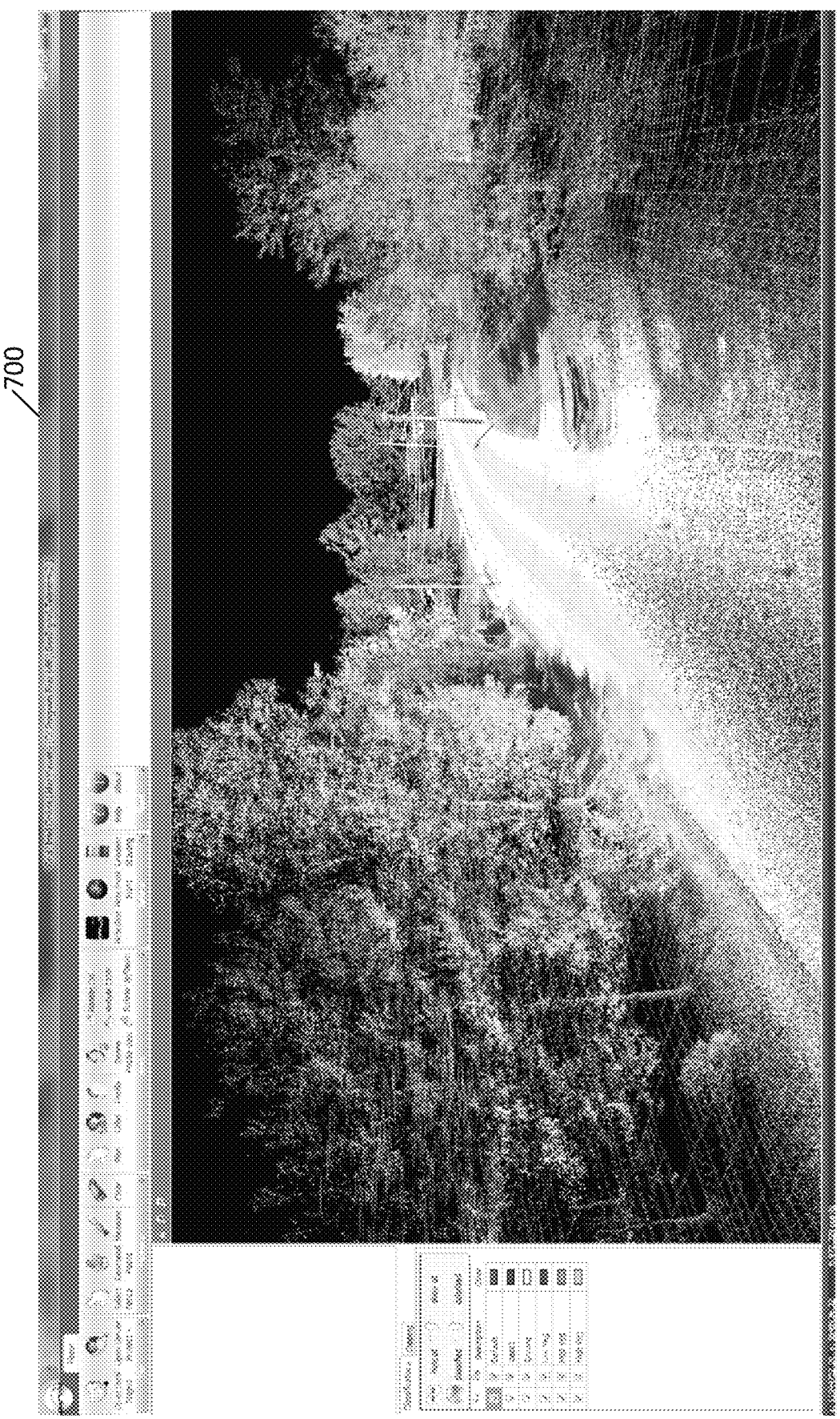
FIG. 7 is a screen shot of a computer screen with an example of a three dimensional scene.

Referring now to FIG. 7, a screen shot 700 of a computer screen with an example of a three dimensional scene 702 is shown. As described above, a geo-locator is used to tag a plurality of points within the image with geo-reference points and a labeler is used to label features of interest.

Figure 8:
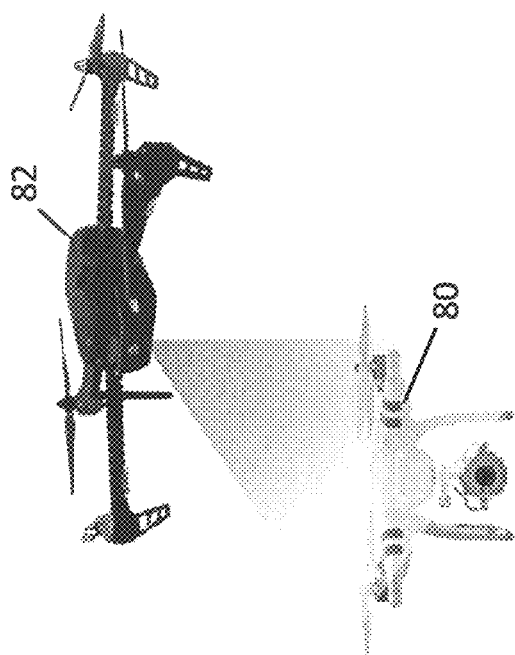
FIG. 8 is a diagram of a drone viewing a target drone.
Figure 8:
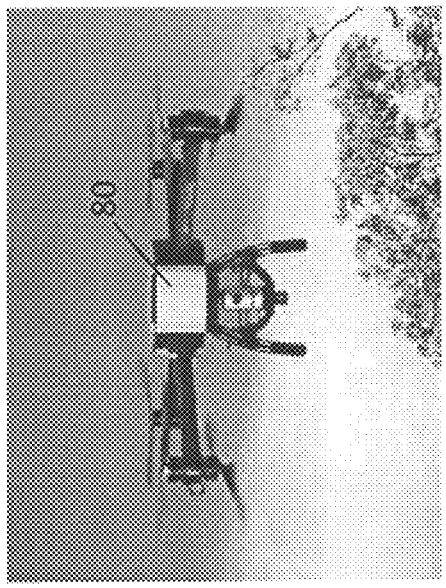

Referring now to FIG. 8, to implement countermeasures to render a target drone 80 useless when the drone is identified as a nuisance or danger, an intercept drone 82 can be deployed. In certain embodiments, the intercept drone has on-board GPS and ability to fly to GPS locations; the intercept drone can receive waypoints by radio; the tracking system is surveyed in so it's GPS location is known; the tracking system can translate track into GPS coordinates; the intercept drone is commanded over radio link to fly to GPS coordinates to put in range of a tracked target. Coordinates may be an offset or a projection from tracked target (above, ahead, below, etc). Trigger of a counter measure (jammer, net, etc) can be done automatically or by a human pressing button. To speed deployment, an intercept drone 82 may be stationed at high altitude (~400 ft) by tether to ground power, allowing it to stay in place 24 hrs/day until needed to deploy—dropping ground tether and intercepting from above.

Figure 9:
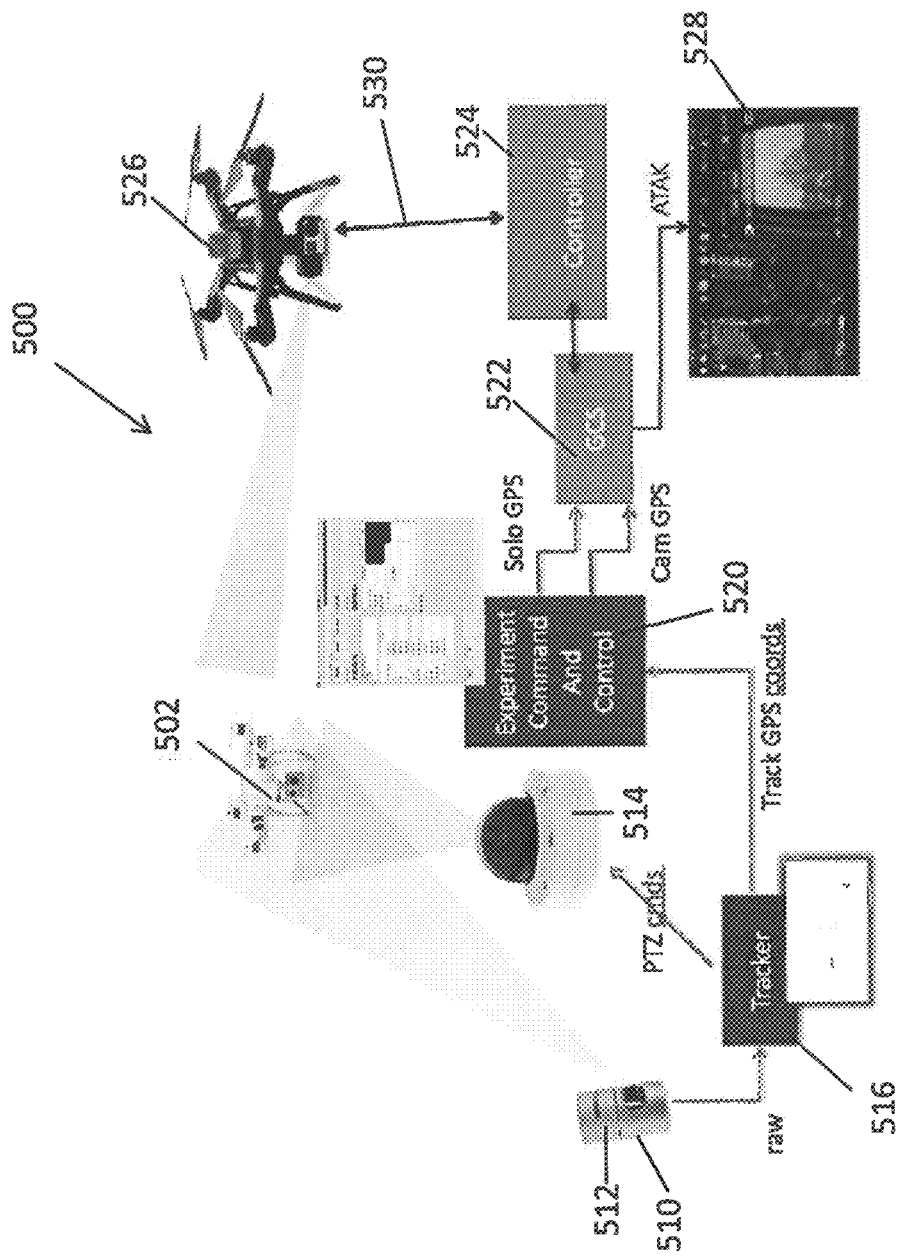
FIG. 9 is a block diagram of a system to implement a drone detection system.

Referring now to FIG. 9, a drone detection system 500 is shown to include a plurality of detection sensors 510 arranged to detect an object, more specifically a drone 502. A detection processor 512 captures the existence of the drone 502 and cues the presence of the drone 502 to a tracking sensor 514 which acquires and tracks at long range the drone using target tracker 516. Target tracker 516 provides track and the tracking sensor (514)'s GPS coordinates to command and control processor 520 which in turn translates the track from sensor coordinates into GPS coordinates and provides GPS coordinates of the drone 502 to ground control station 522. Alternatively, the control processor, knowing the current location of the intercept drone (526) in GPS coordinates through the ground control station (522), can determine a proper intercept course for the intercept drone 526, and command the velocity and vector of travel for intercept drone 526 to intercept the drone 502. The ground control station 522 then provides controls to drone controller 524 which controls an intercept drone 526. The ground control station 522 also provides image data to a tablet 528 such as an Android Tactical Assault Kit (ATAK) tablet 528. The intercept drone 526 has on-board GPS receiver and ability to fly to GPS locations and can receive waypoints by radio. The tracking system is surveyed in so it's GPS location is known. The tracking system can translate track into GPS coordinates. The intercept drone 526 is commanded over radio link 530 to fly to GPS coordinates to put in range of tracked target. Coordinates may be an offset or a projection from tracked target drone 502 (above, ahead, below, etc). The command and control processor 520 or the ground control station 522 can then trigger a counter measure (jammer, net, etc) initiated automatically or by a human pressing a button.

With such an arrangement, a high powered intercept drone can be flown under supervised autonomy of a system that is tracking a threat drone with a long range LIDAR. The supervised autonomy is performed by processing the detection and tracking information, and sending command instructions to the intercept drone to fly to the location of the threat drone. The location of the threat drone is updated by the tracking performed by the long range LIDAR. The intercept drone can carry any of a number of payloads that are appropriate to disable the threat when in sufficient range. The present approach will allow for the intercept drone to carry many different kinds of packages in close range to the target drone. By waiting until close range to the target before using a counter measure collateral damage can be minimized, jamming ranges can be reduced to a few feet. By using an intercept drone, a human operator can safely abort the intercept after launch. By using a long range LIDAR, the intercept drone can be controlled at far ranges and maintain an accurate track of the target drone.

Figure 10:
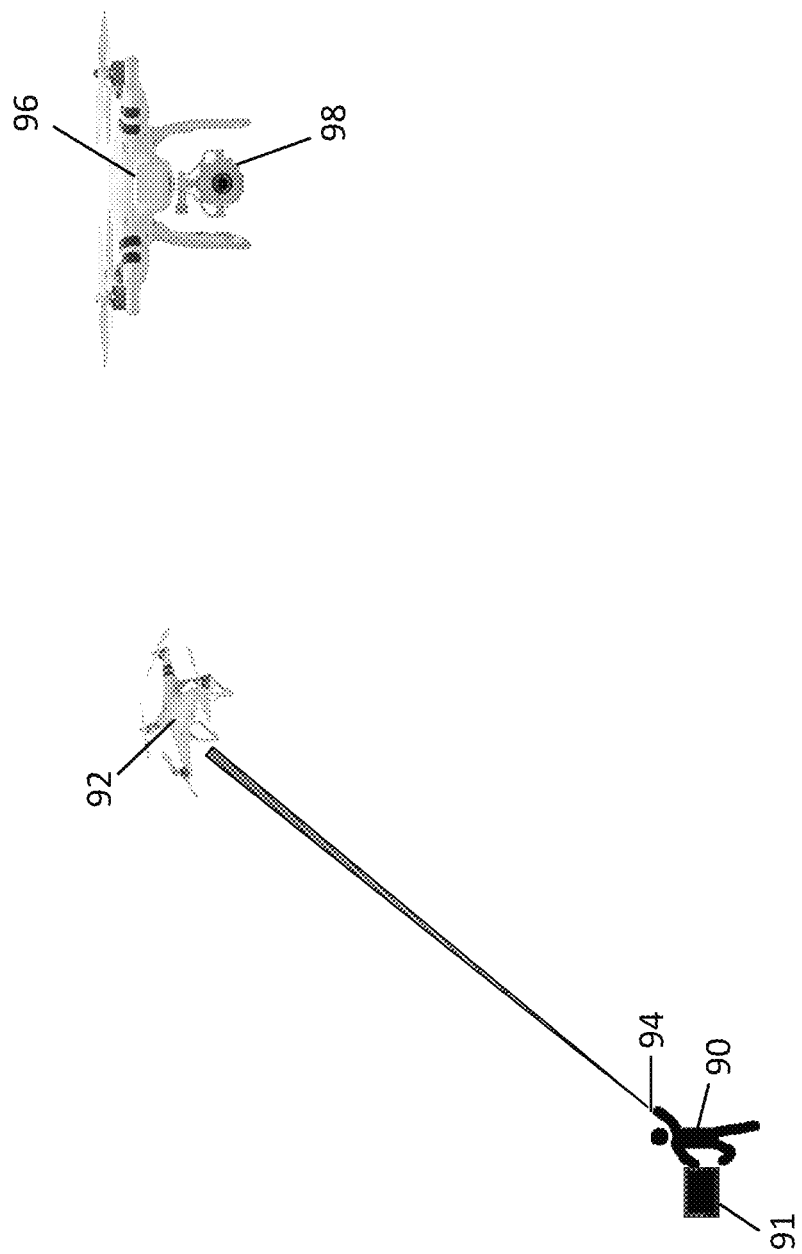
FIG. 10 is a diagram where a user designates a target drone using a pointing device.

Referring now to FIG. 10, drone tracking is accomplished where a human 90 designates a target drone 92 either by a pointing device (laser designator) 94 or an approximate coordinate and a second autonomous intercept drone 96 uses on board sensing (camera or range sensor being two examples) 98 to follow first drone 92 after it has been selected as the target. This is designed to allow a "first responder" (probably two working as a team) to get rid of a nuisance drone. The method of disabling the target is left open, as many different payloads could exist. Target selection can be done by illumination using the pointing device 94, or giving an approximate GPS location (via an ATAK tablet 91 or any available user device such as a smart phone or computer). The intercept drone 96 gives back its understanding of the selected target which is displayed on ATAK tablet 91 for human 90 to confirm. The intercept drone 96 then self pilots to the location of the target. The intercept drone 96 follows the motion of the target drone 92 to update destination GPS coordinates. Tracking can be done with a camera, LIDAR, or other sensor and the intercept drone 96 can use on board sensing or pre-loaded model for obstacle detection to include stereo vision, radar, lidar, ultrasound or the like. An inner loop of next step GPS way points, or a series of thrust commands in a vector, are given to a flight controller (standard robotics practice) to facilitate the course of flight. Bearing and range can be used to project next the waypoint and the status is updated on ATAK tablet 91. The human 90 (user) is allowed to pause, abort, aid the system, or trigger an onboard counter measure (net, jammer, etc).

With such an arrangement, an indication of the target is provided with the pointing device (Laser designator or draw on a screen) and feedback is given to the user by communicating back to a tablet. The intercept drone can be commanded without human intervention (self propelled) by using supervised autonomy where the autonomous seek to destination with obstacle avoidance is provided to the flight path. The ATAK tablet provides a user interface such that the drone gives back its understanding of selected target which is displayed on ATAK tablet for human to confirm and to control the mission with a method of steering or aborting the process, if necessary. As described above, tracking done with camera, LIDAR, or other sensor 98 where the drone self pilots to the location of the target and the intercept drone 96 follows motion of target to update destination GPS coordinate using on board sensing or pre-loaded model for obstacle detection.

Referring again also to FIG. 9, instead of a human providing the initial targeting as shown in FIG. 10, the drone detection system 500 can include the plurality of detection sensors 510 arranged to detect an object or optionally a radar sensor or an acoustical sensor can be used to initially detect an object, more specifically the drone 92. Once initially detected, the second autonomous intercept drone 96 uses on board sensing (camera or range sensor being two examples) 98 to follow first drone 92 after it has been selected as the target.

Figure 11:
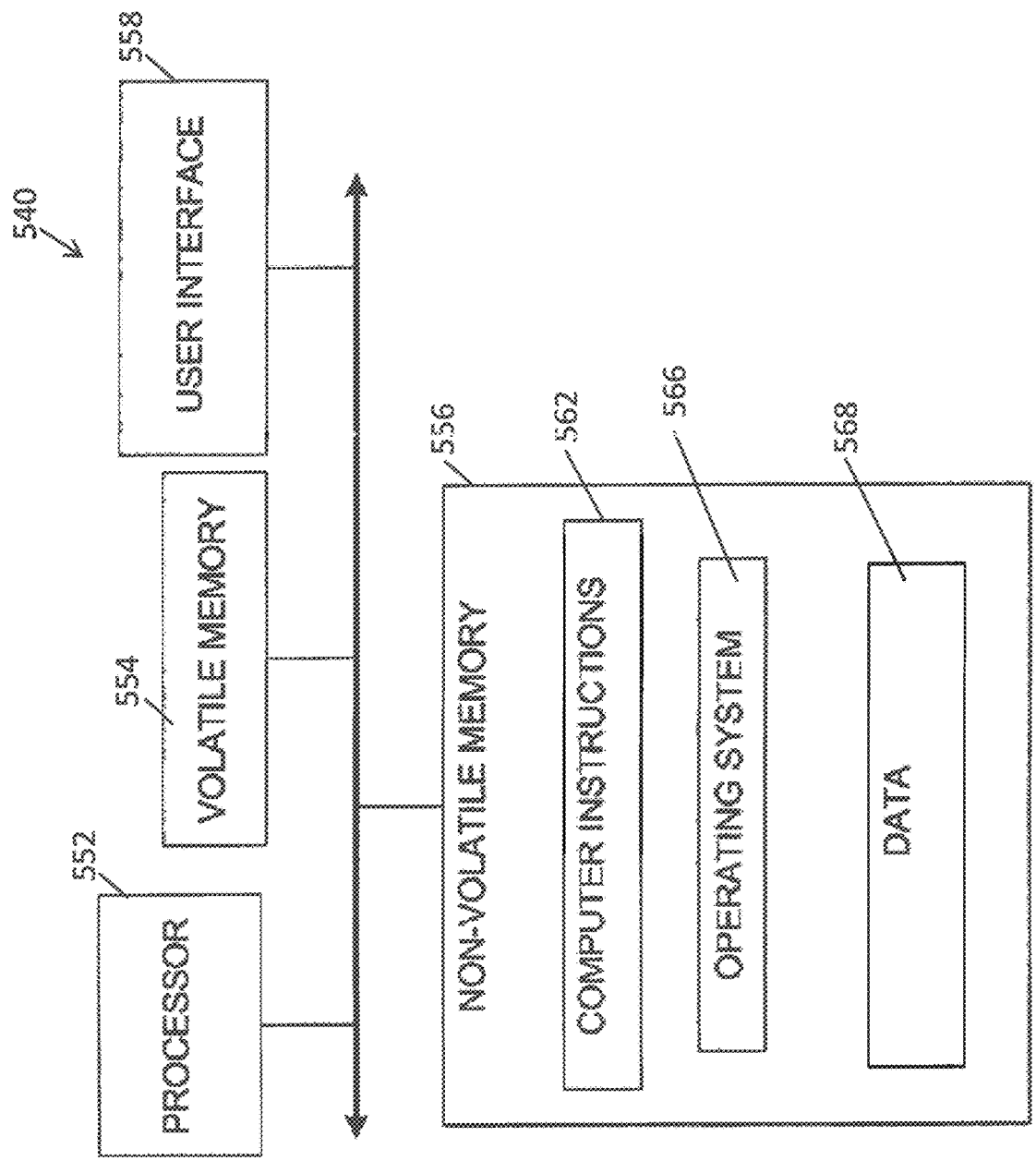
FIG. 11 is a block diagram of a computer that can be used to implement certain features of the system.

Referring to FIG. 11, a computer 540 includes a processor 552, a volatile memory 554, a non-volatile memory 556 (e.g., hard disk) and the user interface (UI) 558 (e.g., a graphical user interface, a mouse, a keyboard, a display, touch screen and so forth). The non-volatile memory 556 stores computer instructions 562, an operating system 566 and data 568. In one example, the computer instructions 562 are executed by the processor 552 out of volatile memory 554 to perform all or part of the processes described herein.

The processes and techniques described herein are not limited to use with the hardware and software of FIG. 11; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. Rather, any of the processing blocks as described above may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A light detection and ranging system for creating a three dimensional model of an environment comprising:
    a light detection and ranging (LIDAR) scanning system to scan an environment to provide an image of a scene of the scanned environment;
    a geo-locator to tag a plurality of points within the image with geo-reference points; and
    a labeler to label features of interest within the image of the scene and to identify possible access paths within the three dimensional model of the environment from the features of interest potentially providing an access path for a target drone wherein the LIDAR scanning system comprises a tracking system to track objects in the scanned environment and the tracking system determines if a new track is a false track by looking where the track originated.

2. The system as recited in claim 1 wherein the tracking system generates an intercept track for an intercept drone from the possible access paths determined from the labeler and the environmental model.

3. The system as recited in claim 1 comprising a response planner to plan safe paths through the environment for an intercept drone.

4. The system as recited in claim 3 wherein the response planner includes identifying false positives.

5. The system as recited in claim 1 comprising a response planner to plan the placement of sensors within the environment to reduce blind spots in the environmental model.

6. The system as recited in claim 1 comprising a response planner to plan interceptions that minimize collateral damage.

7. The system as recited in claim 1 comprising a response planner to select an appropriate countermeasure including deploying a second drone to intercept the target drone.

8. The system as recited in claim 1 comprising a response planner to pilot an intercept drone around obstacles that have been mapped in the scene apriori.

9. A method of providing a three dimension model of an environment comprising:
   scanning an environment using a light detection and ranging scanning system to provide an image of the scanned environment;
   tagging a plurality of points within the image with geo-reference points to identify the location of a plurality of points;
   labeling features of interest within to image and identifying possible access paths within a three dimensional model of the environment from the features of interest an access path for a target drone; and
   tacking objects in the scanned environment and determining if a new track is a false track by, looking where the track originated.

10. The method as recited in claim 9 comprising generating an intercept track for an intercept drone from the possible access paths determined from features of interest within the image.

11. The method as recited in claim 10 comprising identifying false positives.

12. The method as recited in claim 9 comprising planning safe paths through the environment for an intercept drone from the features of interest within the image.

13. The method as recited in claim 9 comprising planning the placement of sensors within the environment to reduce blind spots in the environmental model.

14. The method as recited in claim 9 comprising planning interceptions that minimize collateral damage.

15. The method as recited in claim 9 comprising selecting an appropriate countermeasure including deploying a second drone to intercept the target drone.

16. The method as recited in claim 9 comprising piloting an intercept drone around obstacles that have been mapped in the scene apriori.

17. A drone detection system comprising:
   a light detection and ranging (LIDAR) scanning system to scan an environment to provide an image of a scene of the scanned environment and to detect a target drone entering the scanned environment;
   a geo-locator to tag a plurality of points within the image with geo-reference points;
   a labeler to label features of interest within the image of the scene and to identify possible access paths within a three dimensional model of the environment from the features of interest potentially providing an access path for the target drone; and
   a response planner to select an appropriate countermeasure including deploying a second drone to intercept the target drone wherein the LIDAR scanning system comprises a tracking system to track objects in the scanned environment and the tracking system determines if a new track is a false track by looking where the track originated.

18. The drone detection system as recited in claim 17 wherein the tracking system generates an intercept track for an intercept drone from the possible access paths determined from the scanned environment.

* * * * *